United States Patent

Ort

[15] 3,688,668

[45] Sept. 5, 1972

[54] FILM TRANSPORT INDICATOR IN A CAMERA

[72] Inventor: Wolfgang Ort, Stuttgart-Bad Cannstatt, Germany

[73] Assignee: Eastman Kodak Company, Rochester, N.Y.

[22] Filed: Sept. 21, 1970

[21] Appl. No.: 73,829

[30] Foreign Application Priority Data

Nov. 21, 1969 Germany......G 69 45 137.2

[52] U.S. Cl. ..........................95/31 FM, 116/114 J
[51] Int. Cl. .............................................G03b 17/18
[58] Field of Search.......95/31 FL, 31 FM; 116/114 J

[56] References Cited

UNITED STATES PATENTS 3,532,040  10/1970  Ehgartner et al. ......95/31 FM

FOREIGN PATENTS OR APPLICATIONS 890,949  11/1943  France....................116/114 J

*Primary Examiner*—Samuel S. Matthews
*Assistant Examiner*—Russell E. Adams, Jr.
*Attorney*—Robert W. Hampton and D. Peter Hochberg

[57] ABSTRACT

A film transport indicator in a camera includes a sensing finger (15) for engaging metering perforations (7) in a film-strip. When the film is advanced by rotating wheel (11) to the next frame, the finger (15) engages a perforation (7) and pushes a tab (23) into view. This indicates to the camera user that the film has been properly advanced. Upon actuation of the shutter the finger and tab are withdrawn.

3 Claims, 3 Drawing Figures

PATENTED SEP 5 1972

3,688,668

WOLFGANG ORT
INVENTOR.

BY D. Peter Hochberg
Robert W. Hampton

ATTORNEYS

FILM TRANSPORT INDICATOR IN A CAMERA

BACKGROUND OF THE INVENTION

1. Field of the Invention

This invention relates to camera film transport mechanisms, and in particular to mechanisms for assuring the transport of filmstrip in prescribed increments.

2. Description of the Prior Art

A variety of camera mechanisms are known for preventing double exposures of frames of filmstrip and for assuring the proper metering of filmstrip in the camera so that the filmstrip is advanced from a supply chamber towards a take-up chamber in single, full frame increments. Thus, many cameras include devices for preventing shutter operation unless an unexposed frame of film is properly located at the exposure station in the camera. It is also known to provide a signal which becomes visible in the camera viewfinder after the filmstrip has been advanced and the shutter has been actuated, whereby the photographer is warned that the filmstrip must be advanced prior to the next shutter actuation. SUMMARY OF THE INVENTION An object of the present invention is to indicate to the user of a camera when filmstrip in the camera has been transported by an increment defined by indicia on the filmstrip.

Another object is to warn a camera user to discontinue the filmstrip transport operation after the filmstrip has been advanced by a prescribed increment defined by spaced perforations on the filmstrip.

A further object is to indicate, by means of an economical and effective device, that the film transport operation of a camera should be terminated.

Other objects will become apparent to those skilled in the art from the description to follow and from the appended claims.

According to a preferred embodiment of the invention, the above objects are achieved by means of a simple filmstrip transport mechanism in a camera. The mechanism is adapted for use with filmstrip having metering perforations located adjacent a lateral edge of the filmstrip, and comprises: a filmstrip advancing mechanism having a manually operable actuating member, a sensing finger for riding along the film during the filmstrip advancing operation and sequentially entering the perforations, and a signal device coupled to the sensing finger and movable from an inactive position within the camera housing to an active position extending from the camera housing adjacent the actuating member to warn the photographer to discontinue operation of the actuating member. The mechanism is particularly adapted for use with a camera wherein film transport is effected by a wind wheel which is coaxially coupled to a film take-up spool by means of a friction clutch, the mechanism serving to warn the camera user against overwinding of the windwheel.

BRIEF DESCRIPTION OF THE DRAWINGS

Reference is made to the accompanying drawings wherein.

DESCRIPTION OF THE PREFERRED EMBODIMENT

Figure 1:
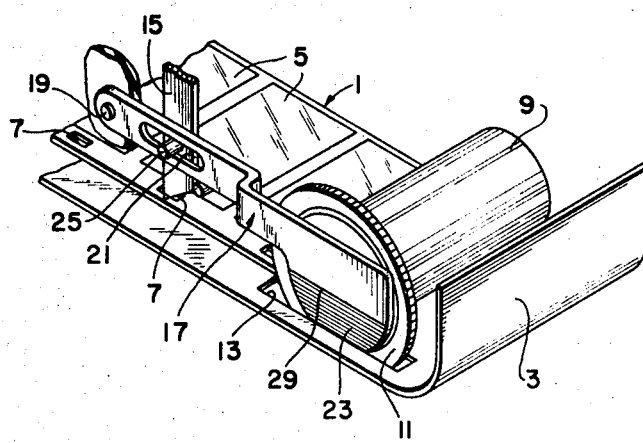
FIG. 1 is a partial pictorial view of a camera incorporating a mechanism according to a preferred embodiment of the invention.

Referring to the drawings, filmstrip 1 is shown loaded in a camera having a housing 3. The filmstrip has the form of an elongate web and includes a series of exposure areas or frames 5, each frame having adjacent thereto a perforation 7 serving as an indicium indicative of the location of the frame. During the operation of the camera, filmstrip 1 is advanced to the right and wound in convolute form on a take-up spool 9, the leading end of the filmstrip having been initially attached to the spool in a known manner. Take-up spool 9 is rotated counterclockwise to effect film advancement by means of the manual rotation of a wind wheel 11. Wind wheel 11 is mounted coaxially with spool 9, and is coupled to the latter element by a friction clutch. The clutch permits continued rotation of wind wheel 11 even if spool 9 is prevented from rotating, without damage to the filmstrip. The diameter of wind wheel 11 is sufficient to permit a portion of the wind wheel to extend through an appropriate opening 13 in housing 3, thereby rendering the wind wheel manually accessible.

In order to prevent multiple exposures at portions of the filmstrip and to make efficient use of the available exposure area of the filmstrip, it is necessary to transport the filmstrip in increments by sequentially locating frames 5 at an exposure station, making an exposure, and advancing the filmstrip by distance defined by the position of the next perforation 7. In order to achieve the aforementioned result, a mechanism according to the invention signals the photographer when the filmstrip has been advanced by a frame length so that he will discontinue the rotation of wind wheel 11. A sensing finger 15 is mounted for movement from a first or inactive position in which sensing finger 15 is located between a pair of perforations on the filmstrip as shown in FIG. 2 and a second or active position wherein sensing finger 15 has entered a perforation 7 as indicated in FIGS. 1 and 3.

A signal device 17 is pivotally mounted on a post 19 for movement between active and inactive positions. Device 17 comprises an arm having an elongate slot 21 and tab 23. A pin 25 attached to sensing finger 15 extends through slot 21, such that device 17 pivots about post 19 in response to the movement of finger 15 between its first and second positions. Tab 23 has a flat, semicircular configuration, and is adapted to fit into an appropriately configured recess 27 in the wind wheel 11, Device 17 moves in a plane slightly spaced from the adjacent surface of wheel 11, and a crease 29 is provided adjacent tab 23 whereby the latter moves within recess 27 during the pivotal movement of signal device 17.

Opening 13 is dimensioned to permit the extension of tab 23 from within housing 3 adjacent wind wheel 11. Recess 27 and tab 23 are preferably of readily distinguishable colors such as red for the former and black for the latter element, whereby the presence or absence of tab 23 at the exterior of housing 3 is readily visible. The presence of tab 23 on the extending portion of wind wheel 11 indicates that an unexposed frame of filmstrip is properly positioned in the camera for an exposure, Operation of the mechanism is straightforward. Assuming an exposure has been made previously, filmstrip 1 is advanced and wound on spool 9 by the counterclockwise rotation of wind wheel 11. During the film advancement process, sensing finger 15 rides on the surface of filmstrip 1 adjacent the lateral edge in which perforations 7 are located as shown in FIG. 2. When sensing finger 15 is in this inactive position, pin 25 holds signal device 17 in its inactive position. Sensing finger 15 is braised towards its active position, i.e. towards filmstrip 1, by appropriate means, but the bias must be weak enough to prevent damage or bending of the film by finger 15. The bias could be provided on device 17 for urging the latter in a clockwise direction, with pin 25 restraining the signal device against the bias when sensing finger 15 is in the inactive position, and with device 17 urging finger 15 towards the active position.

Figure 2:
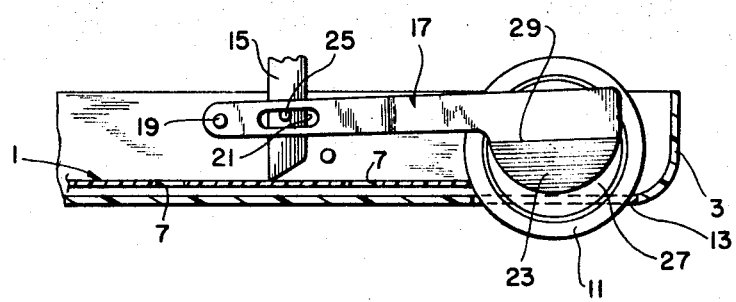
FIGS. 2 and 3 are end views of the apparatus depicted in FIG. 1 at two stages in the operation thereof.
Figure 3:
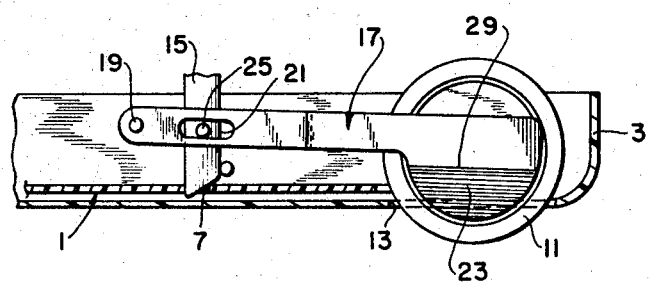

When a perforation 7 aligns vertically with sensing finger 15 as indicated in FIGS. 1 and 3, finger 15 enters perforation 7. The foregoing movement causes pin 25 to drive signal device 17 clockwise about post 19, moving tab 23 into view on wind wheel 11. The photographer is thereby warned to discontinue winding wind wheel 11, and unexposed frame having been transported to the exposure position.

Upon actuation of the shutter, means coupled to the shutter operating mechanism withdraw sensing finger 15 from perforation 7, whereby tab 23 disappears into the camera. Finger 15 is moved slightly to the left in a known manner and set to rest on the filmstrip when the shutter operating member is released by the photographer. The mechanism in now in the condition shown in FIG. 2.

The invention has been disclosed in detail with particular reference to a preferred embodiment thereof, but it is to be understood that variations and modifications within the spirit and scope of the invention will be apparent to those skilled in the art to which the invention pertains.

I claim:

1. In a camera adapted for picture taking operation to make successive exposures of a filmstrip having metering perforations at predetermined intervals therealong, a mechanism for indicating that an unexposed portion of the filmstrip is at a predetermined exposure position, said mechanism comprising:

means for advancing the filmstrip past a predetermined exposure position and the perforations in the filmstrip past a predetermined metering position;

means including a signal device movable between an inactive and an indicating position, for providing an indication visible externally of the camera predetermined exposure position; and means for moving said signal device to said indicating position in response to arrival of a perforation in the filmstrip at said predetermined metering position and for moving said signal device to said inactive position in response to picture taking operation of the camera.

2. In a camera adapted for picture taking operation to make successive exposures of a filmstrip having metering perforations at predetermined intervals therealong, a mechanism for indicating when an unexposed portion of the filmstrip is at a predetermined exposure position, said mechanism comprising;

means for advancing the filmstrip past a predetermined exposure position;

means for sensing advance of the filmstrip including a sensing finger movable between a retracted position and an extended position, said finger moving to said extended position in response to engagement of said finger with a metering perforation in the filmstrip, and said finger moving to said retracted position in response to picture taking operation of the camera;

means, including a signal device movable between an inactive position and an indicating position in which at least a portion of said signal device is visible externally of the camera, for indicating that an unexposed portion of the filmstrip is at said predetermined exposure position; and means for moving said signal device to said indicating position in response to movement of said finger to said extended position and for moving said signal device to said inactive position in response to movement of said finger to said retracted position.

3. A mechanism as in claim 2 wherein said signal device further defines an aperture and said signal device moving means includes a pin mounted on said sensing finger to extend into said aperture, said pin moving said signal device between said inactive and indicating positions in response to movement of said sensing finger between said retracted and extended positions.

* * * * *

PO-1050
(5/69)

UNITED STATES PATENT OFFICE
CERTIFICATE OF CORRECTION

Patent No. 3,688,668          Dated September 5, 1972

Inventor(s) Wolfgang Ort

It is certified that error appears in the above-identified patent and that said Letters Patent are hereby corrected as shown below:

Column 4, line 3     after "camera" please insert --that an unexposed portion of the filmstrip is at said--

Signed and sealed this 22nd day of May 1973.

(SEAL)
Attest:

EDWARD M. FLETCHER, JR.          ROBERT GOTTSCHALK
Attesting Officer                Commissioner of Patents